United States Patent [19]
Edwards et al.

[11] Patent Number: 5,193,905
[45] Date of Patent: Mar. 16, 1993

[54] VEHICLE HEADLAMP ADJUSTER

[75] Inventors: Michael R. Edwards, Mishawaka, Ind.; Arthur R. Fry, Rockford, Ill.

[73] Assignee: Elco Industries, Inc., Rockford, Ill.

[21] Appl. No.: 806,622

[22] Filed: Dec. 13, 1991

[51] Int. Cl.⁵ .............................................. F21M 3/18
[52] U.S. Cl. ..................................... 362/425; 362/69; 362/428; 74/89.17
[58] Field of Search ............... 74/89.17; 362/425, 423, 362/427, 428, 418, 419, 69, 70, 66, 61

[56] References Cited

U.S. PATENT DOCUMENTS

| | | | |
|---|---|---|---|
| 1,497,896 | 6/1924 | Edgecumbe et al. | 362/425 |
| 1,772,918 | 8/1930 | Sklarek | 362/423 |
| 3,494,205 | 2/1970 | Heese | 74/89.17 |
| 3,634,002 | 1/1972 | Vollrath | 74/89.17 |
| 4,478,103 | 10/1984 | Benjamin | 74/425 |
| 4,524,407 | 6/1985 | Igura | 362/66 |
| 4,674,018 | 6/1987 | Ryder et al. | 362/424 |
| 4,689,725 | 8/1987 | Saijo et al. | 362/66 |
| 4,707,770 | 11/1987 | Van Duyn | 362/66 |
| 4,939,945 | 7/1990 | Ryder et al. | 362/427 |
| 5,023,759 | 6/1991 | Eckenrode | 362/66 |
| 5,079,676 | 1/1992 | Lisak | 362/61 |

Primary Examiner—Allen M. Ostrager
Assistant Examiner—Alan B. Cariaso
Attorney, Agent, or Firm—Leydig, Voit & Mayer

[57] ABSTRACT

A mechanism for adjusting the vertical or horizontal aim of a vehicle headlamp includes a rod-like link supported by a slide to move linearly relative to a housing and having an outer end connected to the headlamp. The inner end portion of the link includes a helical thread form which meshes with a second helical thread form on a rotatable driver extending perpendicular to the link. When the driver is rotated, the thread forms coact to advance or retract the link and thereby adjust the headlamp. A plastic bushing snaps onto the driver and into the housing to support the driver for rotation in the housing.

10 Claims, 3 Drawing Sheets

U.S. Patent  Mar. 16, 1993  Sheet 1 of 3  5,193,905
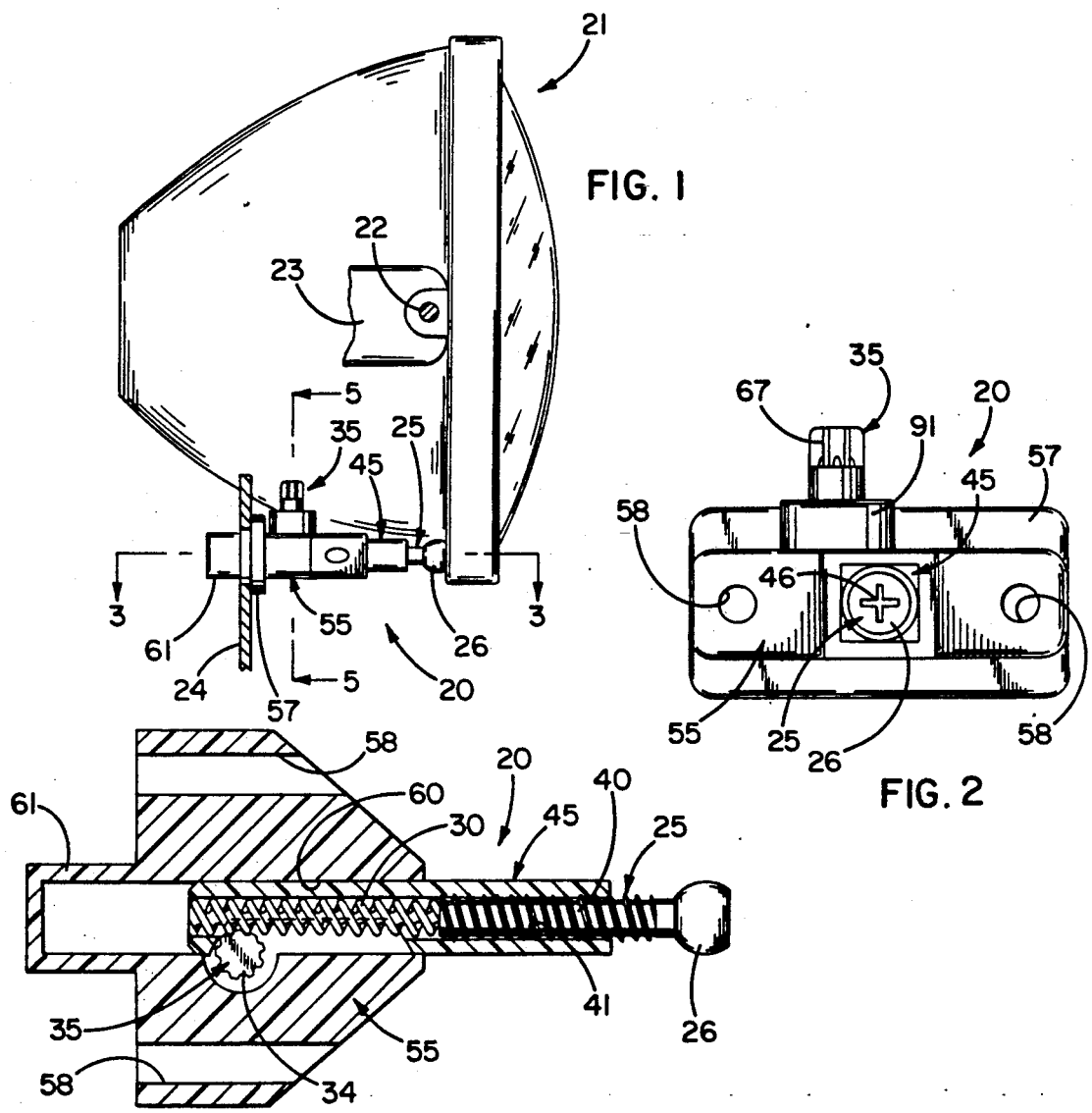
FIG. 1
FIG. 2
FIG. 3
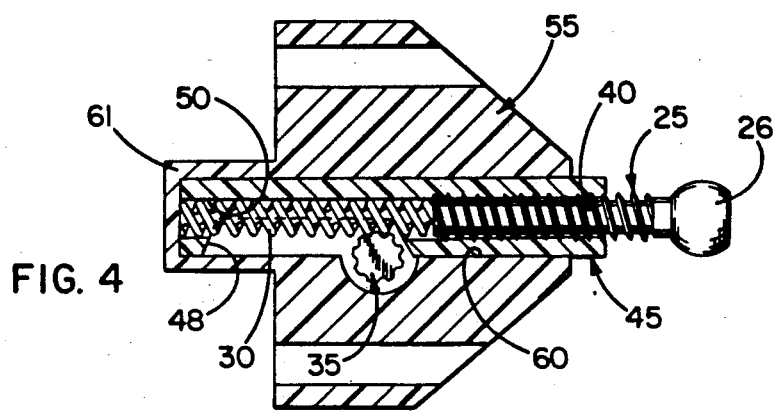
FIG. 4

VEHICLE HEADLAMP ADJUSTER

BACKGROUND OF THE INVENTION

This invention relates generally to a mechanism for adjusting a vehicle headlamp.

Eckenrode U.S. Pat. No. 5,023,759 discloses a headlamp adjusting mechanism for a modern headlamp assembly of the type in which both the high and low beam bulbs are contained in a common housing adapted to be adjusted angularly from inside the vehicle engine compartment in order to properly aim the beam of the headlamp. In the Eckenrode adjuster, an internally threaded worm gear encircles a non-rotatable screw and is operable when rotated to move the screw axially and effect adjustment of the headlamp. Rotation of the worm gear is produced in response to manual rotation of a driver in the form of a worm which extends generally perpendicular to the screw. A plastic housing supports the worm and the worm gear for rotation and constrains the screw against rotation while permitting the screw to move axially back and forth.

The Eckenrode adjuster requires three drive components, namely, the worm, the internally threaded worm gear and the screw. The worm gear requires both internal and external drive components and causes the lateral width of the drive to be relatively large. Moreover, there is a possibility of backlash between the worm and the worm gear on one hand and between the worm gear and the screw on the other hand and thus detrimental fore and aft play of the screw can develop and result in vibration of the headlamp.

SUMMARY OF THE INVENTION

The general aim of the present invention is to provide a new and improved headlamp adjusting mechanism in which the drive is of a simple two-component construction which is relatively narrow in lateral width and which is comparatively stiff in a fore and aft direction so as to virtually eliminate vibration of the headlamp.

A more detailed object of the invention is to achieve the foregoing by providing an adjusting mechanism in which a manually rotatable driver is formed with a first helical thread form which directly engages a second helical thread form on an adjusting link and produces linear movement of the link in response to rotation of the driver.

Still another object of the invention is to provide a unique bushing for rotatably supporting the driver in a housing and for enabling quick and easy assembly of the driver with the housing.

The invention also resides in the provision of a slide for preventing rotation of the adjusting link and in the novel manner of interconnecting the slide and the link.

These and other objects and advantages of the invention will become more apparent from the following detailed description when taken in conjunction with the accompanying drawings.

BRIEF DESCRIPTION OF THE DRAWINGS

FIG. 1 is a side elevational view of a typical automotive headlamp assembly equipped with a new and improved adjusting mechanism incorporating the unique features of the present invention.

FIG. 2 is an enlarged front elevational view of the adjusting mechanism.

FIG. 3 is an enlarged cross-section taken substantially along the line 3—3 of FIG. 1.

FIG. 4 is a view similar to FIG. 3 but shows certain components of the adjusting mechanism in moved positions.

DETAILED DESCRIPTION OF THE PREFERRED EMBODIMENT

Figure 5:
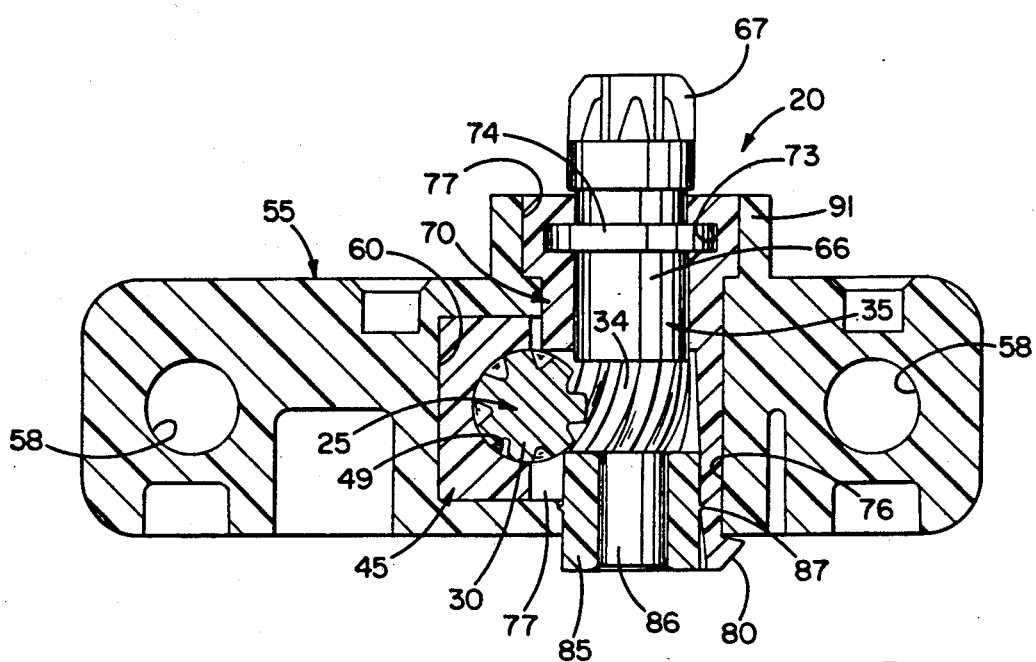
FIG. 5 is an enlarged cross-section taken substantially along the line 5—5 of FIG. 1.

For purposes of illustration, the invention has been shown in the drawings as being embodied in a mechanism 20 for adjusting a vehicle headlamp assembly 21 in order to align the headlamp assembly properly with respect to the vehicle. The headlamp assembly is of typical modern construction in which high and low beam replaceable bulbs are contained in a single housing adapted to be adjusted from the interior of the engine compartment.

The headlamp assembly 21 itself may be mounted in various ways and, for purposes of simplicity, the assembly has been illustrated only diagrammatically in FIG. 1. Thus, the assembly has been shown as being supported to swing upwardly and downwardly about a generally horizontal pivot 22 on a fixed frame part 23 of the vehicle. Another fixed frame part 24 is located behind the headlamp assembly and supports the adjusting mechanism 20. The latter normally holds the headlamp assembly in a fixed position about the pivot 22 but may be adjusted to change the vertical tilt of the assembly.

Connected to the headlamp assembly 21 is a link 25 which forms part of the adjusting mechanism 20 and which, when moved linearly back and forth, serves to rock the headlamp assembly about the pivot 22 in order to change the vertical tilt of the assembly. Herein, the link is in the form of an elongated and generally cylindrical rod. Formed integrally with the forward end of the rod 25 is a generally spherical head 26 adapted to be received within a generally spherical seat (not shown) of the headlamp assembly in order to connect the rod to the headlamp while allowing the headlamp to rock about the pivot 22 as well as about a vertically extending pivot axis.

In accordance with the present invention, the rod 25 is constrained against rotation and its rear end portion is formed with a helical thread form 30 which directly engages a second helical thread form 34 formed on a manually rotatable driver 35 disposed at right angles to the rod. When the driver 35 is rotated, the engagement of its helical thread form 34 with the helical thread form 30 of the rod 25 causes the rod to advance axially and thereby effect adjustment of the headlamp assembly 21. As will become apparent subsequently, this two-component adjusting mechanism is economical, is small in lateral width and virtually eliminates fore and aft play of the rod.

Figure 7:
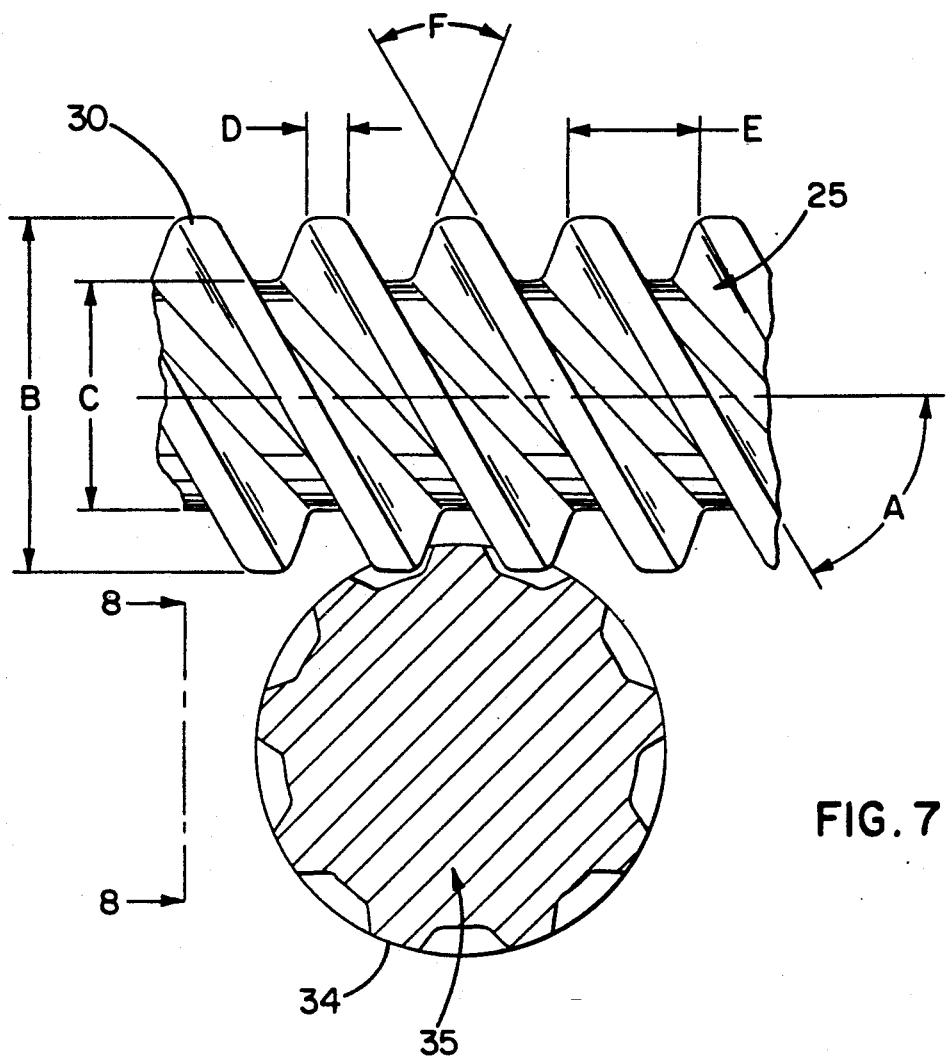
FIG. 7 is an enlarged view of the two helical thread forms shown in FIGS. 3 and 4.

More specifically, the rod 24 herein is made of steel and is approximately 60 mm. long. The helical thread form 30 starts at the rear end of the rod and extends forwardly through a distance of about 37.5 mm. In this instance, the thread form preferably is defined by multiple threads or starts rather than by a single thread, there being seven identical threads on the present rod. Each thread is a modified acme thread with a 60 degree lead or helix angle A (FIG. 7), with a major diameter B of about 6.35 mm., with a root diameter C of about 4.05 mm., with a crest width D of about 0.75 mm., with a pitch E of about 2.35 mm. and with a flank angle F of about 40 degrees.

Formed on the forward end portion of the rod 25 and extending forwardly from the thread form 30 is a helical screw thread 40 (FIGS. 4 and 6) which may be of the type known as PLASFORM thread. The screw thread 40 is screwed tightly into an axially extending hole 41 (FIG. 6) which is formed in an elongated slide 45 preferably molded of plastic. The hole 41 and the major diameter of the screw thread 40 are somewhat larger than the major diameter of the thread form 30 so as to enable the rod 25 to be assembled with the slide 45 by slipping the thread form into the hole from the forward end of the slide. When the screw thread 40 encounters the hole 41, the rod 25 is rotated and advanced axially by a driving tool (not shown) which engages with a drive recess 46 (FIG. 6) in the forward end of the head 26. As the thread 40 is driven into the hole 41, it cuts into the plastic and very securely anchors the rod 25 against rotation relative to the slide 45.

In the finally assembled position of the rod 25, one side (e.g., approximately 180 degrees) of a substantial lengthwise portion of the thread form 30 is exposed by virtue of a generally U-shaped notch or window 48 (FIG. 6) formed in one side of the slide 45 near the rear end thereof. The other side (i.e., the other 180 degrees) of the thread form 30 is received in an arcuate seat 49 which defines a continuation of the hole 41 while the extreme rear end portion of the thread form is received in a hole 50 in the rear end portion of the slide.

The slide 45 coacts with a housing 55 to support the rod 25 for axial movement while preventing rotation of the rod. While the housing may take various forms, the present housing 55 is of one-piece construction and is molded of plastic. The housing includes a generally horizontal and generally triangular body portion 56 (FIG. 6) and further includes an upright mounting flange 57 at the rear end of the body portion. Two laterally spaced holes 58 are formed through the body portion and the flange and receive screws or other fasteners (not shown) for securing the housing to the fixed frame part 24 of the vehicle with the mounting flange disposed in face-to-face engagement with the frame part.

Figure 6:
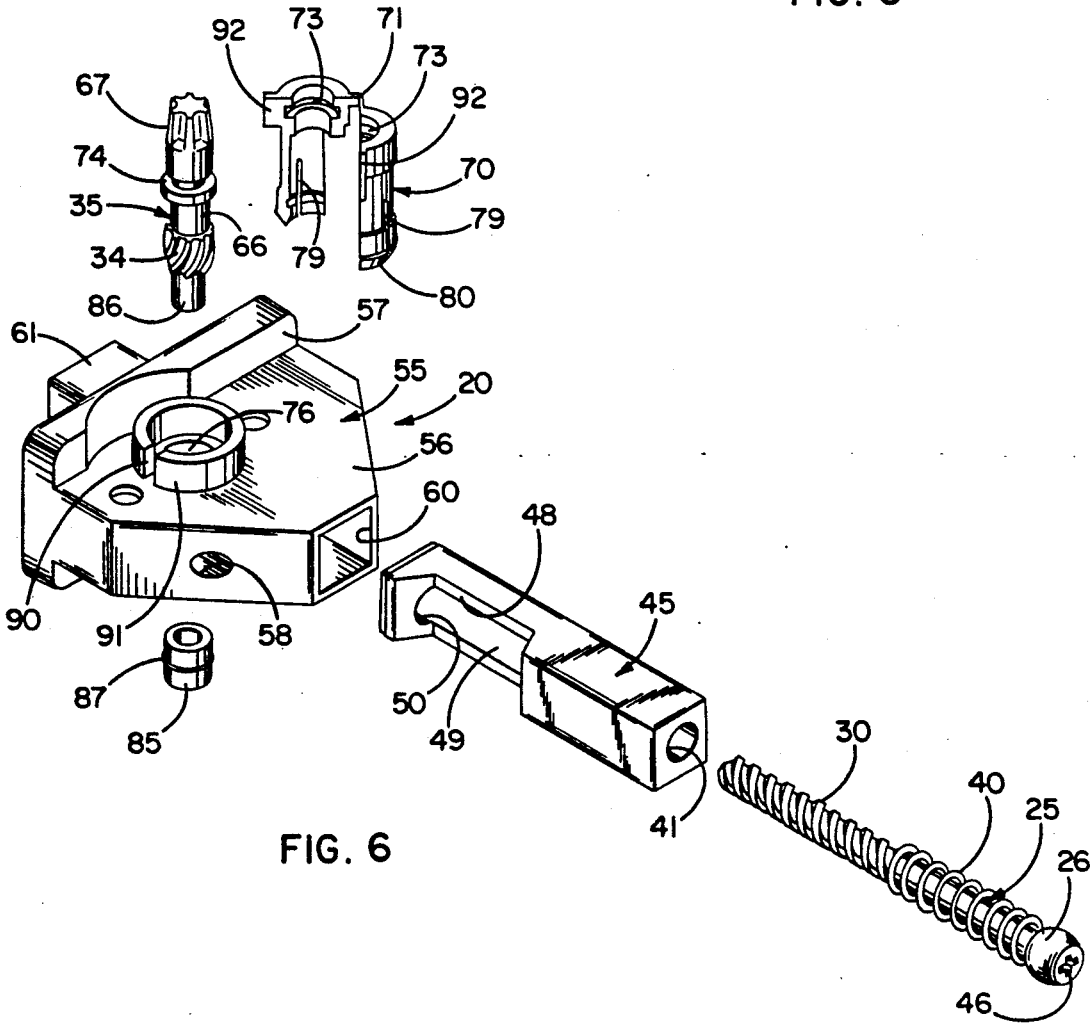
FIG. 6 is an exploded perspective view of the adjusting mechanism.

As shown most clearly in FIG. 6, the slide 45 is rectangular in transverse cross-section and is slidably received in a similarly shaped passage 60 in the body portion 56 of the housing 55. Thus, the slide is free to move back and forth in the housing but is prevented from rotating relative thereto. To enable the housing 55 to accommodate substantially the full length of the slide, a tubular extension 61 (FIGS. 4 and 6) of rectangular cross-section is formed integrally with and projects rearwardly from the mounting flange 57 and receives the rear end portion of the slide when the latter is fully retracted as shown in FIG. 4. In the diagrammatic illustration of FIG. 1, the extension 61 has been shown as projecting rearwardly through an opening in the frame part 24 of the vehicle.

Figure 8:
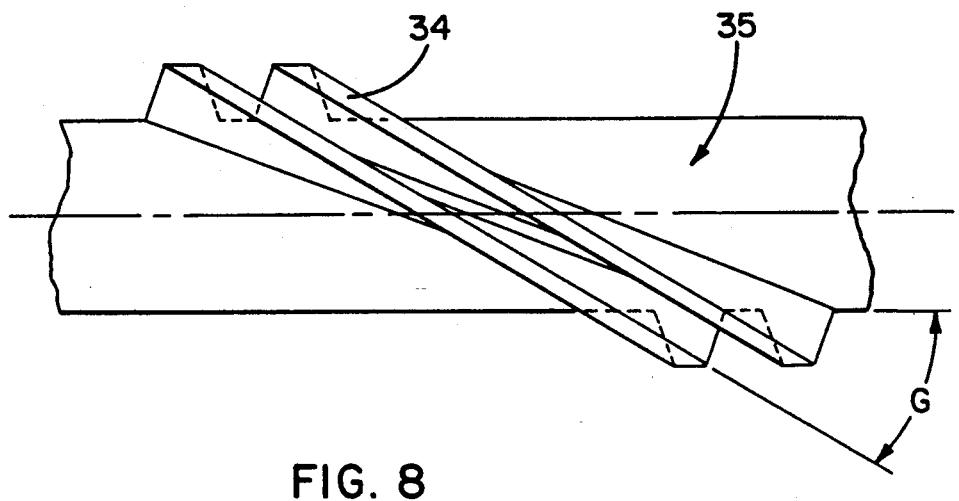
FIG. 8 is an enlarged view of the helical thread form of the driver as seen in the direction of the arrows of the line 8—8 of FIG. 7.

The driver 35 includes a rod-like shank 66 (FIG. 6), preferably made of steel, and supported by the housing 55 to rotate about an upright axis extending generally perpendicular to the path of movement of the slide 45. The thread form 34 of the driver is located between the ends of the shank and, in this particular instance, is defined by nine identical multiple threads or starts (see FIG. 7). Each thread of the thread form 34 also is a modified acme thread but with a 30 degree lead or helix angle G (FIG. 8), with a major diameter of about 7.35 mm. and with a root diameter of about 5.05 mm. The crest width, pitch and flank angle of the thread form 34 are the same as for the thread form 30.

By virtue of the 60 degree lead angle on the thread form 30 and the 30 degree lead angle on the thread form 34, the two thread forms mesh with one another when the driver 35 is located perpendicular to and at one side of the rod 25. It should be appreciated, however, that the two thread forms 30 and 34 could be provided with other lead angles totaling 90 degrees. By way of example, the lead angle of each thread form could be 45 degrees.

When the driver 35 is rotated in one direction, the thread form 34 coacts with the thread form 30 to retract the rod 25 and the slide 45 from the position shown in FIG. 3 toward the position shown in FIG. 4 and thereby effect downward tilting of the headlamp assembly 21. Rotation of the driver in the opposite direction extends the rod and the slide back toward the position of FIG. 3 so as to tilt the headlamp upwardly. To facilitate rotation of the driver 35, a TORX driving head 67 (FIG. 6) or other type of driving head is formed on the upper end of the shank 66 and is adapted to telescope into an appropriately shaped drive socket (not shown). Alternatively, a recess similar to the recess 46 in the head 26 of the rod 25 may be formed in the upper end of the shank 66 to receive a male driving tool for rotating the driver 35.

The driver 35 is supported for rotation within the housing 55 by a relatively simple bushing 70 (FIGS. 5 and 6) which enables quick and easy assembly of the driver and the housing. Herein, the bushing is molded of plastic and, as molded, comprises two identical and generally semi-cylindrical halves or sections as shown in FIG. 6. The upper end portions of the two bushing sections at least initially are connected by a short plastic strap 71 defining a hinge which enables the two sections to be swung toward one another and closed upon the driver 35. As an incident to such closing, circumferentially extending grooves 73 formed in the bushing sections snap onto an annular flange 74 formed around the shank 66 between the thread form 34 and the head 67. There is a slight interference fit between the grooves and the flange and, as a result, the walls of the grooves frictionally grip the flange to hold the split bushing 70 in assembled relation with the driver 35.

As shown most clearly in FIG. 5, the main length of the bushing 70 is received in a hole 76 in the housing 55 while the upper end portion of the bushing is seated within a counterbore 77 formed at the upper end of the hole, such seating limiting downward movement of the bushing relative to the housing. In the area of the thread form 34 of the driver 35, the bushing does not define a full cylinder but instead is formed with a window 77 (FIG. 5) which exposes the thread form and allows that thread form to mesh with the thread form 30 of the rod 25. A window also is defined in the wall of the hole 76 in the vicinity of the thread form 34 and establishes communication between the hole and the window 48 in the slide 45 so as to permit the thread form 34 to engage the thread form 30.

The window 77 extends to the lower end of the bushing 70 and thus makes the lower end portion of the bushing radially flexible. To impart additional radial flexibility to the lower end portion of the bushing, angularly spaced and axially extending slits 79 (FIG. 6) are formed through the lower end portion of the bushing.

After the bushing 70 has been assembled to the driver 35, the bushing is telescoped downwardly into the hole 76 in the housing 55. Formed integrally with and extending around the lower end of the bushing is an outwardly projecting lip 80 (FIG. 5). Because of its flexibility, the lower end of the bushing collapses radially inwardly as the bushing is inserted into the hole and allows the lip 80 to pass into and through the hole. Once the lip clears the lower end of the hole, it expands outwardly and snaps beneath the housing 55 to restrict upward movement of the bushing and hold the bushing in assembled relation with the housing.

To help keep the bushing 70 assembled to the housing 55, a cylindrical plastic collar 85 (FIGS. 5 and 6) is telescoped into the lower end portion of the hole 76 and into the lower end portion of the bushing and is telescoped over a reduced diameter lower end portion 86 of the driver shank 66. The outer surface of the collar is formed with an annular rib 87 which snaps into grooves in the bushing and the housing when the collar is slipped upwardly into the housing and the bushing from the lower end thereof. Accordingly, the collar 85 helps lock the bushing against upward movement relative to the housing and, in addition, forms a 360 degree bearing for the lower end portion 86 of the driver 35.

Means are provided for orienting the bushing 70 angularly such that the window 77 in the bushing is aligned automatically with the window 48 in the slide 45 when the bushing is assembled with the housing 55. Herein, these means comprise a radially extending slot 90 (FIG. 6) formed in a boss 91 on the upper side of the housing and adapted to receive tabs 92 on the upper end portion of the bushing 70. The tabs 92 must be aligned angularly with the slot 90 to enable the bushing 70 to be inserted into the hole 76 and, when such alignment exists, the window 77 of the bushing is oriented properly with respect to the window 48 of the slide 45.

From the foregoing, it will be apparent that the present invention brings to the art a new and improved headlamp adjuster 20 in which the adjusting drive is formed by two relatively simple components, namely, the helical thread form 30 on the rod 25 and the helical thread form 34 on the driver 35. The meshing engagement of the two thread forms provides a drive which is very stiff in the fore and aft direction so as to securely hold the headlamp 21 and prevent the headlamp from vibrating. In addition, the drive provided by the two directly engaging thread forms is relatively compact in the lateral direction. The snap-on, snap-in bushing 70 enables quick and easy assembly of the driver 35 with the housing 55 while supporting the driver for rotation within the housing.

We claim:

1. A mechanism for adjusting a vehicle headlamp relative to a frame, said mechanism comprising a housing adapted to be secured to said frame, a link adapted to be connected to said headlamp, said link being constrained against rotation, being constrained to move linearly in first and second opposite directions relative to the housing and being operable when moved linearly to adjust said headlamp with respect to said frame, said link comprising a rod-like end portion, a first thread form extending helically along and around said end portion, said first thread from being movable linearly with said link and being non-rotatable relative to said link, and selectively operable means for moving said link in either of said directions, said selectively operable means comprising a rod-like driver journaled by said housing to rotate about an axis extending generally perpendicular to the path of movement of said link, and a second thread form extending helically along and around said driver and directly engaging said first thread form to advance said link linearly in response to rotation of said driver.

2. A mechanism as defined in claim 1 in which the sum of the lead angle of said first thread form and the lead angle of said second thread form is approximately 90 degrees.

3. A mechanism as defined in claim 2 in which each of said thread forms is defined by multiple threads.

4. A mechanism as defined in claim 1 in which said housing is molded of plastic and is formed with an internal passage, a plastic slide block slidably supported within said passage and constrained against movement other than in said first and second directions, and means connecting said link rigidly to said block.

5. A mechanism as defined in claim 4 in which said connecting means comprise a helical screw thread on said link adjacent said first thread form and screwed tightly into said slide block.

6. A mechanism as defined in claim 4 further including an opening in said slide block adjacent said first thread form and receiving said second thread form to permit engagement of said thread forms.

7. A mechanism as defined in claim 1 further including a hole extending through said housing and substantially concentric with said axis, a bushing received in said hole and supporting said driver for rotation, said bushing having means holding said bushing in said hole with a snap fit and having means holding said bushing on said driver with a snap fit.

8. A mechanism as defined in claim 7 further including an opening in said bushing adjacent said first thread from and permitting said second thread form to mesh with said first thread form.

9. A mechanism for adjusting a vehicle headlamp relative to a frame, said mechanism comprising a plastic housing adapted to be secured to said frame, a plastic slide supported by said housing and constrained by said housing to move linearly into and out of said housing, a rod having an outer end adapted to be connected to said headlamp and having an outer end portion screwed tightly into said slide to cause said rod and said slide to move linearly in unison, said rod being operable when moved to adjust said headlamp relative to said frame, said rod comprising an inner end portion having a first thread form which extends helically along and around said inner end portion, and selectively operable means for moving said rod in either of said directions, said selectively operable means comprising a rod-like driver journaled by said housing to rotate about an axis extending generally perpendicular to the path of movement of said rod, and a second thread form extending helically along and around said driver and engaging said first thread form to advance said rod linearly in response to rotation of said driver.

10. A mechanism as defined in claim 9 in which the sum of the lead angle of said first thread form and the lead angle of said second thread form is approximately 90 degrees, each of said thread forms being defined by multiple threads.

* * * * *